US009065731B2

(12) United States Patent
Thibeault et al.

(10) Patent No.: US 9,065,731 B2
(45) Date of Patent: Jun. 23, 2015

(54) ENSURE UPSTREAM CHANNEL QUALITY MEASUREMENT STABILITY IN AN UPSTREAM CHANNEL BONDING SYSTEM USING T4 TIMEOUT MULTIPLIER

(75) Inventors: Brian K. Thibeault, Alttleboro, MA (US); Deborah P. Clark, Dudley, MA (US)

(73) Assignee: ARRIS Technology, Inc., Suwanee, GA (US)

( * ) Notice: Subject to any disclaimer, the term of this patent is extended or adjusted under 35 U.S.C. 154(b) by 246 days.

(21) Appl. No.: 13/461,329

(22) Filed: May 1, 2012

(65) Prior Publication Data
US 2013/0294489 A1    Nov. 7, 2013

(51) Int. Cl.
| | | |
|---|---|---|
| *G01R 31/08* | (2006.01) | |
| *H04L 12/26* | (2006.01) | |
| *H04N 7/16* | (2011.01) | |
| *H04N 21/61* | (2011.01) | |
| *H04N 7/173* | (2011.01) | |
| *H04N 17/00* | (2006.01) | |

(Continued)

(52) U.S. Cl.
CPC .............. *H04L 43/08* (2013.01); *H04N 7/163* (2013.01); *H04N 21/6168* (2013.01); *H04N 7/17309* (2013.01); *H04N 17/004* (2013.01); *H04N 21/2408* (2013.01); *H04N 21/437* (2013.01)

(58) Field of Classification Search
CPC ............... H04N 7/17309; H04N 21/44222; H04N 21/4788; H04N 7/163; H04N 21/6583; H04N 7/17336
See application file for complete search history.

(56) References Cited

U.S. PATENT DOCUMENTS 3,838,221 A    9/1974    Schmidt et al.
4,245,342 A    1/1981    Entenman
(Continued)

FOREIGN PATENT DOCUMENTS

DE    69631420 T2    12/2004
EP    1235402 A2    8/2002
(Continued)

OTHER PUBLICATIONS

Cable Television Laboratories, Inc., Data-Over-Cable Service Interface Specifications DOCSIS® 3.0—MAC and Upper Layer Protocols Interface Specification, Nov. 17, 2011 (770 pages).
(Continued)

*Primary Examiner* — Chieh M Fan
*Assistant Examiner* — Sarah Hassan
(74) *Attorney, Agent, or Firm* — Stewart M. Wiener

(57) ABSTRACT

A method and computing device for maintaining the stability of the upstream channel quality measurements in an upstream channel bonded system. The method configures a cable modem, that communicates using bonded channels, to periodically exchange ranging messages on the bonded channels, where a bonded channel ranging interval determines a period for the exchange. The method also monitors a signal quality metric for a monitored channel of the bonded channels by periodically retrieving a quality measurement for the monitored channel, a period between each retrieval determined by a channel quality monitoring interval. The method sends an invite ranging message to the cable modem before retrieval of the quality measurement for the monitored channel, and retrieves the quality measurement for the monitored channel. The method bases the signal quality metric for the monitored channel on the quality measurement.

17 Claims, 3 Drawing Sheets

(51) Int. Cl.
*H04N 21/24* (2011.01)
*H04N 21/437* (2011.01)

(56) References Cited

U.S. PATENT DOCUMENTS

| | | | |
|---|---|---|---|
| 4,385,392 A | 5/1983 | Angell et al. |
| 4,811,360 A | 3/1989 | Potter |
| 4,999,787 A | 3/1991 | McNally et al. |
| 5,228,060 A | 7/1993 | Uchiyama |
| 5,251,324 A | 10/1993 | McMullan |
| 5,271,060 A | 12/1993 | Moran et al. |
| 5,278,977 A | 1/1994 | Spencer et al. |
| 5,347,539 A | 9/1994 | Sridhar et al. |
| 5,390,339 A | 2/1995 | Bruckert et al. |
| 5,463,661 A | 10/1995 | Moran et al. |
| 5,532,865 A | 7/1996 | Utsumi et al. |
| 5,557,603 A | 9/1996 | Barlett et al. |
| 5,606,725 A | 2/1997 | Hart |
| 5,631,846 A | 5/1997 | Szurkowski |
| 5,692,010 A | 11/1997 | Nielsen |
| 5,694,437 A | 12/1997 | Yang et al. |
| 5,732,104 A | 3/1998 | Brown et al. |
| 5,790,523 A | 8/1998 | Ritchie et al. |
| 5,862,451 A | 1/1999 | Grau et al. |
| 5,867,539 A | 2/1999 | Koslov |
| 5,870,429 A | 2/1999 | Moran et al. |
| 5,886,749 A | 3/1999 | Williams et al. |
| 5,939,887 A | 8/1999 | Schmidt et al. |
| 5,943,604 A | 8/1999 | Chen et al. |
| 5,987,061 A * | 11/1999 | Chen | 375/222 |
| 6,002,722 A * | 12/1999 | Wu | 375/295 |
| 6,032,019 A | 2/2000 | Chen et al. |
| 6,044,107 A * | 3/2000 | Gatherer et al. | 375/222 |
| 6,061,393 A | 5/2000 | Tsui et al. |
| 6,108,351 A | 8/2000 | Hardy et al. |
| 6,154,503 A | 11/2000 | Strolle |
| 6,229,792 B1 | 5/2001 | Anderson et al. |
| 6,230,326 B1 | 5/2001 | Unger et al. |
| 6,233,274 B1 | 5/2001 | Tsui et al. |
| 6,240,553 B1 | 5/2001 | Son et al. |
| 6,272,150 B1 | 8/2001 | Hrastar et al. |
| 6,278,730 B1 | 8/2001 | Tsui et al. |
| 6,308,286 B1 | 10/2001 | Richmond et al. |
| 6,310,909 B1 | 10/2001 | Jones |
| 6,321,384 B1 | 11/2001 | Eldering |
| 6,330,221 B1 | 12/2001 | Gomez |
| 6,334,219 B1 | 12/2001 | Hill et al. |
| 6,377,552 B1 | 4/2002 | Moran et al. |
| 6,385,773 B1 | 5/2002 | Schwartzman et al. |
| 6,389,068 B1 | 5/2002 | Smith et al. |
| 6,434,583 B1 | 8/2002 | Dapper et al. |
| 6,445,734 B1 | 9/2002 | Chen et al. |
| 6,456,597 B1 | 9/2002 | Bare |
| 6,459,703 B1 | 10/2002 | Grimwood et al. |
| 6,477,197 B1 | 11/2002 | Unger |
| 6,480,469 B1 | 11/2002 | Moore et al. |
| 6,483,033 B1 | 11/2002 | Simoes et al. |
| 6,498,663 B1 | 12/2002 | Farhan et al. |
| 6,512,616 B1 | 1/2003 | Nishihara |
| 6,526,260 B1 | 2/2003 | Hick et al. |
| 6,546,557 B1 | 4/2003 | Ovadia |
| 6,556,239 B1 | 4/2003 | Al Araji et al. |
| 6,556,562 B1 | 4/2003 | Bhagavath et al. |
| 6,556,660 B1 | 4/2003 | Li et al. |
| 6,559,756 B2 | 5/2003 | Al Araji et al. |
| 6,563,868 B1 | 5/2003 | Zhang et al. |
| 6,570,394 B1 | 5/2003 | Williams |
| 6,570,913 B1 | 5/2003 | Chen |
| 6,574,797 B1 | 6/2003 | Naegeli et al. |
| 6,588,016 B1 | 7/2003 | Chen et al. |
| 6,606,351 B1 | 8/2003 | Dapper et al. |
| 6,611,795 B2 | 8/2003 | Cooper |
| 6,646,677 B2 | 11/2003 | Noro et al. |
| 6,662,135 B1 | 12/2003 | Burns et al. |
| 6,662,368 B1 | 12/2003 | Cloonan et al. |
| 6,671,334 B1 | 12/2003 | Kuntz et al. |
| 6,687,632 B1 | 2/2004 | Rittman |
| 6,690,655 B1 | 2/2004 | Miner et al. |
| 6,700,875 B1 | 3/2004 | Schroeder et al. |
| 6,700,927 B1 | 3/2004 | Esliger et al. |
| 6,711,134 B1 | 3/2004 | Wichelman et al. |
| 6,741,947 B1 | 5/2004 | Wichelman et al. |
| 6,748,551 B2 | 6/2004 | Furudate et al. |
| 6,757,253 B1 * | 6/2004 | Cooper et al. | 370/241 |
| 6,772,388 B2 | 8/2004 | Cooper et al. |
| 6,772,437 B1 | 8/2004 | Cooper et al. |
| 6,775,840 B1 | 8/2004 | Naegel et al. |
| 6,816,463 B2 | 11/2004 | Cooper et al. |
| 6,834,057 B1 | 12/2004 | Rabenko et al. |
| 6,839,829 B1 | 1/2005 | Daruwalla et al. |
| 6,853,932 B1 | 2/2005 | Wichelman et al. |
| 6,877,166 B1 | 4/2005 | Roeck et al. |
| 6,895,043 B1 | 5/2005 | Naegeli et al. |
| 6,895,594 B1 | 5/2005 | Simoes et al. |
| 6,906,526 B2 | 6/2005 | Hart et al. |
| 6,928,475 B2 | 8/2005 | Schenkel et al. |
| 6,944,881 B1 | 9/2005 | Vogel |
| 6,961,314 B1 | 11/2005 | Quigley et al. |
| 6,961,370 B2 | 11/2005 | Chappell |
| 6,967,994 B2 | 11/2005 | Boer et al. |
| 6,973,141 B1 | 12/2005 | Isaksen et al. |
| 6,985,437 B1 | 1/2006 | Vogel |
| 6,987,754 B2 | 1/2006 | Shahar et al. |
| 6,999,408 B1 | 2/2006 | Gomez |
| 7,002,899 B2 | 2/2006 | Azenkot et al. |
| 7,010,002 B2 | 3/2006 | Chow et al. |
| 7,017,176 B1 | 3/2006 | Lee et al. |
| 7,032,159 B2 | 4/2006 | Lusky et al. |
| 7,039,939 B1 | 5/2006 | Millet et al. |
| 7,050,419 B2 | 5/2006 | Azenkot et al. |
| 7,054,554 B1 | 5/2006 | McNamara et al. |
| 7,058,007 B1 | 6/2006 | Daruwalla et al. |
| 7,072,365 B1 | 7/2006 | Ansley |
| 7,079,457 B2 | 7/2006 | Wakabayashi et al. |
| 7,099,412 B2 | 8/2006 | Coffey |
| 7,099,580 B1 | 8/2006 | Bulbul |
| 7,139,283 B2 | 11/2006 | Quigley et al. |
| 7,142,609 B2 | 11/2006 | Terreault et al. |
| 7,145,887 B1 | 12/2006 | Akgun et al. |
| 7,152,025 B2 | 12/2006 | Lusky et al. |
| 7,158,542 B1 | 1/2007 | Zeng et al. |
| 7,164,694 B1 | 1/2007 | Nodoushani et al. |
| 7,177,324 B1 | 2/2007 | Choudhury et al. |
| 7,197,067 B2 | 3/2007 | Lusky et al. |
| 7,222,255 B1 | 5/2007 | Claessens et al. |
| 7,227,863 B1 | 6/2007 | Leung et al. |
| 7,242,862 B2 | 7/2007 | Saunders et al. |
| 7,246,368 B1 | 7/2007 | Millet et al. |
| 7,263,123 B2 | 8/2007 | Yousef |
| 7,274,735 B2 | 9/2007 | Lusky et al. |
| 7,295,518 B1 | 11/2007 | Monk et al. |
| 7,315,573 B2 | 1/2008 | Lusky et al. |
| 7,315,967 B2 | 1/2008 | Azenko et al. |
| 7,400,677 B2 | 7/2008 | Jones |
| 7,421,276 B2 | 9/2008 | Steer et al. |
| 7,451,472 B2 | 11/2008 | Williams |
| 7,492,703 B2 | 2/2009 | Lusky et al. |
| 7,554,902 B2 | 6/2009 | Kim et al. |
| 7,573,884 B2 | 8/2009 | Klimker et al. |
| 7,573,935 B2 | 8/2009 | Min et al. |
| 7,584,298 B2 | 9/2009 | Klinker et al. |
| 7,616,654 B2 | 11/2009 | Moran et al. |
| 7,650,112 B2 | 1/2010 | Utsumi et al. |
| 7,672,310 B2 | 3/2010 | Cooper et al. |
| 7,684,315 B1 | 3/2010 | Beser |
| 7,684,341 B2 | 3/2010 | Howald |
| 7,693,090 B1 | 4/2010 | Kimpe |
| 7,701,938 B1 | 4/2010 | Bernstein et al. |
| 7,716,712 B2 | 5/2010 | Booth et al. |
| 7,739,359 B1 | 6/2010 | Millet et al. |
| 7,742,697 B2 | 6/2010 | Cooper et al. |
| 7,742,771 B2 | 6/2010 | Thibeault |
| 7,760,624 B1 | 7/2010 | Goodson et al. |
| 7,778,314 B2 | 8/2010 | Wajcer et al. |

(56) References Cited

U.S. PATENT DOCUMENTS

| | | | |
|---|---|---|---|
| 7,787,557 | B2 | 8/2010 | Kim et al. |
| 7,792,183 | B2 | 9/2010 | Massey et al. |
| 7,826,569 | B2 | 11/2010 | Popper et al. |
| 7,856,049 | B2 | 12/2010 | Currivan et al. |
| 7,876,697 | B2 | 1/2011 | Thompson et al. |
| 7,953,144 | B2 | 5/2011 | Allen et al. |
| 7,958,534 | B1 | 6/2011 | Beser |
| 7,970,010 | B2 | 6/2011 | Denney et al. |
| 7,983,162 | B1 | 7/2011 | Ford et al. |
| 8,000,254 | B2 | 8/2011 | Thompson et al. |
| 8,037,541 | B2 | 10/2011 | Montague et al. |
| 8,040,915 | B2 | 10/2011 | Cummings |
| 8,059,546 | B2 | 11/2011 | Pai et al. |
| 8,081,674 | B2 | 12/2011 | Thompson et al. |
| 8,116,360 | B2 | 2/2012 | Thibeault |
| 8,265,559 | B2 | 9/2012 | Cooper et al. |
| 8,284,828 | B2 | 10/2012 | Cooper et al. |
| 8,345,557 | B2 | 1/2013 | Thibeault et al. |
| 2001/0055319 | A1 | 12/2001 | Quigley et al. |
| 2002/0038461 | A1 | 3/2002 | White et al. |
| 2002/0044531 | A1 | 4/2002 | Cooper et al. |
| 2002/0091970 | A1 | 7/2002 | Furudate et al. |
| 2002/0116493 | A1 | 8/2002 | Schenkel et al. |
| 2002/0119783 | A1 | 8/2002 | Bourlas et al. |
| 2002/0154620 | A1 | 10/2002 | Azenkot et al. |
| 2002/0168131 | A1 | 11/2002 | Walter et al. |
| 2002/0181395 | A1 | 12/2002 | Foster et al. |
| 2003/0028898 | A1 | 2/2003 | Howald |
| 2003/0043732 | A1 | 3/2003 | Walton et al. |
| 2003/0067883 | A1 | 4/2003 | Azenkot et al. |
| 2003/0067944 | A1 | 4/2003 | Sala et al. |
| 2003/0101463 | A1 | 5/2003 | Greene et al. |
| 2003/0108052 | A1 | 6/2003 | Inoue et al. |
| 2003/0120819 | A1 | 6/2003 | Abramson et al. |
| 2003/0138250 | A1 | 7/2003 | Glynn |
| 2003/0149991 | A1 | 8/2003 | Reidhead et al. |
| 2003/0158940 | A1 | 8/2003 | Leigh |
| 2003/0179768 | A1 | 9/2003 | Lusky et al. |
| 2003/0179770 | A1 | 9/2003 | Reznic et al. |
| 2003/0179821 | A1 | 9/2003 | Lusky et al. |
| 2003/0181185 | A1 | 9/2003 | Lusky et al. |
| 2003/0182664 | A1 | 9/2003 | Lusky et al. |
| 2003/0185176 | A1 | 10/2003 | Lusky et al. |
| 2003/0188254 | A1 | 10/2003 | Lusky et al. |
| 2003/0200317 | A1 | 10/2003 | Zeitak et al. |
| 2003/0212999 | A1 | 11/2003 | Cai |
| 2004/0015765 | A1 | 1/2004 | Cooper et al. |
| 2004/0042385 | A1 | 3/2004 | Kim et al. |
| 2004/0047284 | A1 | 3/2004 | Eidson |
| 2004/0052248 | A1 | 3/2004 | Frank et al. |
| 2004/0052356 | A1 | 3/2004 | McKinzie et al. |
| 2004/0062548 | A1 | 4/2004 | Obeda et al. |
| 2004/0073937 | A1 | 4/2004 | Williams |
| 2004/0096216 | A1 | 5/2004 | Ito |
| 2004/0109661 | A1 | 6/2004 | Bierman et al. |
| 2004/0139473 | A1 | 7/2004 | Greene |
| 2004/0163129 | A1 | 8/2004 | Chapman et al. |
| 2004/0181811 | A1 | 9/2004 | Rakib |
| 2004/0208513 | A1 | 10/2004 | Peddanarappagari et al. |
| 2004/0233234 | A1 | 11/2004 | Chaudhry et al. |
| 2004/0233926 | A1 | 11/2004 | Cummings |
| 2004/0248520 | A1 | 12/2004 | Miyoshi |
| 2004/0261119 | A1 | 12/2004 | Williams et al. |
| 2005/0010958 | A1 | 1/2005 | Rakib et al. |
| 2005/0025145 | A1 | 2/2005 | Rakib et al. |
| 2005/0034159 | A1 | 2/2005 | Ophir et al. |
| 2005/0039103 | A1 | 2/2005 | Azenko et al. |
| 2005/0058082 | A1 | 3/2005 | Moran et al. |
| 2005/0064890 | A1 | 3/2005 | Johan et al. |
| 2005/0097617 | A1 | 5/2005 | Currivan et al. |
| 2005/0108763 | A1 | 5/2005 | Baran et al. |
| 2005/0122996 | A1* | 6/2005 | Azenkot et al. ............... 370/477 |
| 2005/0163088 | A1 | 7/2005 | Yamano et al. |
| 2005/0175080 | A1 | 8/2005 | Bouillett |
| 2005/0183130 | A1 | 8/2005 | Sadja et al. |
| 2005/0198688 | A1 | 9/2005 | Fong |
| 2005/0226161 | A1 | 10/2005 | Jaworski |
| 2005/0281200 | A1 | 12/2005 | Terreault |
| 2006/0013147 | A1 | 1/2006 | Terpstra et al. |
| 2006/0088056 | A1* | 4/2006 | Quigley et al. ............... 370/468 |
| 2006/0121946 | A1 | 6/2006 | Walton et al. |
| 2006/0250967 | A1 | 11/2006 | Miller et al. |
| 2006/0262722 | A1 | 11/2006 | Chapman et al. |
| 2007/0002752 | A1 | 1/2007 | Thibeault et al. |
| 2007/0030805 | A1 | 2/2007 | Pantelias et al. |
| 2007/0058542 | A1 | 3/2007 | Thibeault |
| 2007/0076592 | A1 | 4/2007 | Thibeault |
| 2007/0076789 | A1 | 4/2007 | Thibeault |
| 2007/0076790 | A1 | 4/2007 | Thibeault et al. |
| 2007/0086328 | A1 | 4/2007 | Kao et al. |
| 2007/0094691 | A1 | 4/2007 | Gazdzinski |
| 2007/0097907 | A1 | 5/2007 | Cummings |
| 2007/0121712 | A1 | 5/2007 | Okamoto |
| 2007/0133672 | A1 | 6/2007 | Lee et al. |
| 2007/0143654 | A1 | 6/2007 | Joyce et al. |
| 2007/0147489 | A1 | 6/2007 | Sun et al. |
| 2007/0177526 | A1 | 8/2007 | Siripunkaw et al. |
| 2007/0184835 | A1 | 8/2007 | Bitran et al. |
| 2007/0189770 | A1 | 8/2007 | Sucharczuk et al. |
| 2007/0201547 | A1 | 8/2007 | Willcocks et al. |
| 2007/0206600 | A1 | 9/2007 | Klimker et al. |
| 2007/0206625 | A1 | 9/2007 | Maeda |
| 2007/0211618 | A1 | 9/2007 | Cooper et al. |
| 2007/0223512 | A1 | 9/2007 | Cooper et al. |
| 2007/0223513 | A1 | 9/2007 | Pantelias et al. |
| 2007/0223920 | A1 | 9/2007 | Moore et al. |
| 2007/0245177 | A1 | 10/2007 | Cooper et al. |
| 2008/0056713 | A1 | 3/2008 | Cooper et al. |
| 2008/0062888 | A1 | 3/2008 | Lusky et al. |
| 2008/0065960 | A1 | 3/2008 | Cheng et al. |
| 2008/0069006 | A1 | 3/2008 | Walter et al. |
| 2008/0075157 | A1 | 3/2008 | Allen et al. |
| 2008/0101210 | A1 | 5/2008 | Thompson et al. |
| 2008/0125984 | A1 | 5/2008 | Skendzic et al. |
| 2008/0140823 | A1 | 6/2008 | Thompson et al. |
| 2008/0193137 | A1 | 8/2008 | Thompson et al. |
| 2008/0200129 | A1 | 8/2008 | Cooper et al. |
| 2008/0242339 | A1 | 10/2008 | Anderson |
| 2008/0250508 | A1 | 10/2008 | Montague et al. |
| 2008/0274700 | A1 | 11/2008 | Li |
| 2008/0291840 | A1 | 11/2008 | Cooper et al. |
| 2009/0031384 | A1 | 1/2009 | Brooks et al. |
| 2009/0103557 | A1 | 4/2009 | Hong et al. |
| 2009/0103669 | A1 | 4/2009 | Kolze et al. |
| 2009/0109877 | A1 | 4/2009 | Murray et al. |
| 2009/0135754 | A1* | 5/2009 | Yavuz et al. ............... 370/311 |
| 2009/0249421 | A1 | 10/2009 | Liu et al. |
| 2009/0252234 | A1 | 10/2009 | Samdani et al. |
| 2010/0083356 | A1 | 4/2010 | Steckley et al. |
| 2010/0095360 | A1 | 4/2010 | Pavlovski et al. |
| 2010/0128739 | A1 | 5/2010 | Jung et al. |
| 2010/0154016 | A1 | 6/2010 | Li et al. |
| 2010/0154017 | A1 | 6/2010 | An et al. |
| 2010/0157824 | A1 | 6/2010 | Thompson et al. |
| 2010/0158093 | A1 | 6/2010 | Thompson et al. |
| 2010/0185391 | A1 | 7/2010 | Lee et al. |
| 2010/0223650 | A1 | 9/2010 | Millet et al. |
| 2010/0251320 | A1 | 9/2010 | Shafer et al. |
| 2011/0026577 | A1 | 2/2011 | Primo et al. |
| 2011/0030019 | A1 | 2/2011 | Ulm et al. |
| 2011/0069745 | A1 | 3/2011 | Thompson et al. |
| 2011/0072127 | A1 | 3/2011 | Gerber et al. |
| 2011/0110415 | A1 | 5/2011 | Cooper et al. |
| 2011/0150058 | A1 | 6/2011 | Oh |
| 2011/0153683 | A1 | 6/2011 | Hoskinson |
| 2011/0194418 | A1 | 8/2011 | Wolcott et al. |
| 2011/0194597 | A1 | 8/2011 | Wolcott et al. |
| 2011/0197071 | A1 | 8/2011 | Wolcott et al. |
| 2011/0243214 | A1 | 10/2011 | Wolcott et al. |
| 2012/0027069 | A1 | 2/2012 | Clausen et al. |
| 2012/0054312 | A1 | 3/2012 | Salinger |
| 2012/0084416 | A1 | 4/2012 | Thibeault et al. |
| 2012/0093240 | A1 | 4/2012 | McFarland et al. |
| 2012/0147751 | A1 | 6/2012 | Ulm |

(56) References Cited

U.S. PATENT DOCUMENTS

| | | |
|---|---|---|
| 2013/0041990 A1 | 2/2013 | Thibeault et al. |
| 2013/0051442 A1 | 2/2013 | Cooper et al. |
| 2013/0128723 A1 | 5/2013 | Thibeault et al. |
| 2013/0148707 A1 | 6/2013 | Thibeault et al. |
| 2013/0286852 A1 | 10/2013 | Bowler et al. |
| 2013/0290783 A1 | 10/2013 | Bowler et al. |
| 2013/0290791 A1 | 10/2013 | Basile et al. |
| 2013/0291034 A1 | 10/2013 | Basile et al. |
| 2013/0294489 A1 | 11/2013 | Thibeault et al. |
| 2014/0029654 A1 | 1/2014 | Thompson et al. |
| 2014/0029655 A1 | 1/2014 | Thompson et al. |
| 2014/0133533 A1 | 5/2014 | Thibeault et al. |
| 2014/0185428 A1 | 7/2014 | Thibeault et al. |

FOREIGN PATENT DOCUMENTS

| | | |
|---|---|---|
| EP | 1341335 A2 | 9/2003 |
| JP | 55132161 A | 10/1980 |
| JP | 04208707 A | 7/1992 |
| JP | 6120896 A | 4/1994 |
| JP | 6177840 A | 6/1994 |
| JP | 09008738 A | 1/1997 |
| JP | 9162816 A | 6/1997 |
| JP | 10247893 A | 9/1998 |
| JP | 11230857 A | 8/1999 |
| JP | 2001044956 A | 2/2001 |
| JP | 2003530761 A | 10/2003 |
| JP | 2004172783 A | 6/2004 |
| JP | 2004343678 A | 12/2004 |
| WO | 0192901 A1 | 6/2001 |
| WO | 0233974 A1 | 4/2002 |
| WO | 2004062124 A1 | 7/2004 |
| WO | 2009146426 A1 | 12/2009 |
| WO | 2011/097646 A1 | 8/2011 |

OTHER PUBLICATIONS

PCT Search Report & Written Opinion, Re: Application #PCT/US2013/038718, Oct. 8, 2013.
"Access, Terminals, Transmission and Mutliplexing (ATTM); Third Generation Transmission Systems for Interactive Cable Television Services—IP Cable Modems; Part 4: MAC and Upper Layer Protocols; DOCSIS 3.0", European Standard, European Telecommunications Standards Institute (ETSI), vol. ATTM AT3, No. V1.1.1., Nov. 1, 2011, pp. 100-111.
Cisco Systems, Inc., "Configuring Load Balancing and Dynamic Channel Change (DCC) on the Cisco CMTS", URL: www.cisco.com/en/US/docs/cable/cmts/troubleshooting_batch9/cmtslbg.pdf (dated Jan. 2009).
B. Volpe, "DOCSIS 3.0 Partial Service", The Volpe Firm, URL: volpefirm.com/docsis-3-0-partial-service (blog posting dated Jul. 12, 2011).
B. Volpe, "DOCSIS 3.0 Tutorial—Upstream Channel Bonding", The Volpe Firm, URL: volpefirm.com/upstream-channel-bonding (blog posting dated Aug. 22, 2010).
B. Volpe, et al., "Cable-Tec Expo 2011: Advanced Troubleshooting in a DOCSIS 3.0 Plant", The Volpe Firm, URL: http://bradyvolpe.com/wp-content/uploads/2012/01/VM_Expo2011_v1-blog.pdf (dated Nov. 2011).
Cisco Systems, Inc. "Upstream Channel Bonding", URL: www.cisco.com/en/US/docs/ios/cable/configuration/guide/ubr_uscb.pdf (dated Nov. 2009 and last updated Jul. 2012).
"A Simple Algorithm for Fault Localization Using Naming Convention and Micro-reflection Signature," Invention Disclosure 60193, Cable Television Laboratories, Inc., Jun. 2008, p. 2.
"Data-Over-Cable Service Interface Specifications DOCSIS 3.0: MAC and Upper Layer Protocols Interface," CM-SP-MULPIv3.0-116-110623, Cable Television Laboratories, Inc., Jun. 2011, section 8, pp. 242-266.
"DOCSIS Best Practices and Guidelines; Proactive Network Maintenance Using Pre-Equalization," CM-GL-PNMP-V01-100415, Cable Television Laboratories, Inc., pp. 123.
"Pre-Equalization Based Pro-active Network Maintenance Process Model for CMs Transmitting on Multiple Upstream Channels," Invention Disclosure 60203, Cable Television Laboratories, Inc., May 2009, pp. 2.
"Pre-Equalization based pro-active network maintenance process model," Invention Disclosure 60177, Cable Television Laboratories, Inc., Jun. 2008, pp. 2.
"Proactive Network Maintenance Using Pre-Equalization," DOCSIS Best Practices and Guidelines, Cable Television Laboratories, Inc., CM-GL-PNMP-V02-110623, Jun. 23, 2011, pp. 133.
"Radio Frequency Interface Specification," Cable Television Laboratories, Inc., Data-Over-Cable Service Interface Specifications DOCSIS 2.0, CM-SP-RFIv2.0-I06-040804, pp. 524.
Campos, L. A., et al., "Pre-equalization based Pro-active Network Maintenance Methodology," Cable Television Laboratories, Inc., (presentation), 2012, pp. 32.
Howald, R. L., et al., "Customized Broadband—Analysis Techniques for Blended Multiplexes," pp. 12.
Howald, R., "Access Networks Solutions: Introduction to S-CDMA," Presentation to Society of Cable Telecommunications Engineers (SCTE) South Florida Chapter, Motorola, Inc., 2009, pp. 15.
Howald, R., "Upstream Snapshots & Indicators (2009)," Regional Samples, Presentation to Society of Cable Telecommunications Engineers (SCTE) South Florida Chapter, Jan. 2010, pp. 22.
Howald, R., et al., "Characterizing and Aligning the HFC Return Path for Successful DOCSIS 3.0 Rollouts," Society of Cable Telecommunications Engineers (SCTE) Cable Tee Expo, Oct. 2009, pp. 66.
Howald, R., et al., "Docsis 3.0 Upstream: Readiness & Qualification," pp. 17.
Howald, R., et al., "The Grown-Up Potential of a Teenage Phy," pp. 65.
Howald, R.,"DOCSIS 3.0 Upstream: Technology, RF Variables & Case Studies," Access Networks Solutions, 2009, presentation to Society of Cable Telecommunications Engineers (SCTE) South Florida Chapter, Jan. 2010, pp. 23.
Hranac, R., "Linear Distortions, Part 1," Communication Technology, Jul. 1, 2005, accessed at www.cable360.net/print/ct/operations/testing/15131.html, pp. 6.
Liu, X., and Bernstein, A., "Variable Bit Rate Video Services in DOCSIS 3.0 Networks," NCTA Technical Papers, 2008, pp. 12.
Motorola., "White Paper: Expanding Bandwidth Using Advanced Spectrum Management," Sep. 25, 2003, pp. 12.
Newton's Telecom Dictionary, Sep. 1995, Flatiron Publishing, 9th Edition, pp. 216 and 1023, definitions of "carrier to noise ratio" and "signal to noise ratio".
Patrick, M., and Joyce, G., "Delivering Economical IP Video over DOCSIS by Bypassing the M-CMTS with DIBA," SCTE 2007 Emerging Technologies, Topic Subject: Service Velocity & Next Generation Architectures: How Do We Get There?, 2007, pp. 17.
Popper, A., et al, "An Advanced Receiver with Interference Cancellation for Broadband Cable Networks," Juniper Networks, International Zurich Seminar on Broadband Communications Access 2002, pp. 23-1-23-6.
Popper, A., et al, "Ingress Noise Cancellation for the Upstream Channel in Broadband Cable Access Systems," Juniper Networks, IEEE International Conference on Communications 2002, vol. 3, pp. 1808-1812.
Qureshi, S. U. H., "Adaptive Equalization," IEEE, vol. 73, No. 9, Sep. 1985, pp. 1349-1387.
Ramakrishnan, S., "Scaling the DOCSIS Network for IPTV," Cisco Systems, Inc., SCTE Conference on Emerging Technologies and the NCTA Cable Show, 2009, pp. 19.
Shelke, Y. R., "Knowledge Based Topology Discovery and Geo-localization," Thesis, 2010, pp. 173.
Thompson, R., et al., "256-QAM for Upstream HFC," Spring Technical Forum Proceedings, 2010, pp. 142-152.
Thompson, R., et al., "256-QAM for Upstream HFD Part Two," SCTE Cable Tec Expo 2011, Technical Paper, pp. 22.
Thompson, R., et al., "Multiple Access Made Easy," SCTE Cable Tec Expo 2011, Technical Paper, pp. 23.
Thompson, R., et al., "Optimizing Upstream Throughput Using Equalization Coefficient Analysis," National Cable & Telecommunications Association (NCTA) Technical Papers, Apr. 2009, pp. 35.

(56) References Cited

OTHER PUBLICATIONS

Thompson, R., et al., "Practical Considerations for Migrating the Network Toward All-Digital," Society of Cable Telecommunications Engineers (SCTE) Cable-Tec Expo, Oct. 2009, pp. 22.
Thompson, R., et al., "64-QAM, 6.4MHz Upstream Deployment Challenges," SCTE Canadian Summit, Toronto, Canada, Technical Paper, Mar. 2011, pp. 25.
Volpe, B., and Miller, W., "Cable-Tec Expo 2011: Advanced Troubleshooting in a DOCSIS © 3.0 Plant," Nov. 14-17, 2011, pp. 17.
Wolcott, L., "Modem Signal Usage and Fault Isolation," U.S. Appl. No. 61/301,835, filed Feb. 5, 2010.
Zhao, F., et al., "Techniques for minimizing error propagation in decision feedback detectors for recording channels," IEEE Transactions on Magnetics, vol. 37, No. 1, Jan. 2001, pp. 12.

\* cited by examiner

ENSURE UPSTREAM CHANNEL QUALITY MEASUREMENT STABILITY IN AN UPSTREAM CHANNEL BONDING SYSTEM USING T4 TIMEOUT MULTIPLIER

BACKGROUND

A cable modem termination system (CMTS) is communication equipment typically located in a cable operator's headend facility. The CMTS provides high-speed data services, such as cable Internet or voice over Internet Protocol (VoIP), to customer locations. An example of a CMTS is the Motorola Broadband Service Router 64000 (BSR 64000).

A hybrid fiber-coaxial (HFC) network is a broadband network that combines optical fiber and coaxial cable to provide two-way communication between the CMTS and a cable modem or multimedia terminal adapter (MTA). The cable modem is a communication device located at the customer location that receives communication signals from the CMTS on downstream channels, and transmits the other communication signals to the CMTS on upstream channels. The MTA is a communication device at the customer location that provides both the functionality of a cable modem, and VoIP telephone service communication.

Data Over Cable Service Interface Specification (DOCSIS) is an international telecommunications standard that permits the addition of high-speed data transfer to an existing cable television system. Channel bonding is a DOCSIS 3.0 feature that enables a cable modem at a customer location to use multiple downstream channels, or multiple upstream channels, together at the same time. For example, a cable modem configured with four upstream channels can use DOCSIS 3.0 channel bonding to increase the throughput of the upstream communication with the CMTS. The cable modem distributes, or segments, the data packets among the four channels in an upstream bonding group and transmits the data packets to the CMTS in parallel, rather than in series.

The "DOCSIS 3.0 MAC and Upper Layer Protocols Interface Specification" defines the "T4 timeout" parameter as the time that a cable modem will wait for unicast ranging opportunity. In addition, the "DOCSIS 3.0 MAC and Upper Layer Protocols Interface Specification" states that "In Multiple Transmit Channel Mode the CMTS MAY increase the value of the T4 timeout by means of the T4 Timeout Multiplier in order to reduce CMTS overhead associated with scheduling RNG-REQ slots and processing RNG-RSP messages." Thus, if a CMTS vendor chooses to implement the T4 Timeout Multiplier, they may schedule the ranging messages between the CMTS and the cable modems less frequently when operating in upstream channel bonding mode.

Customer locations typically always power-on a cable modem to provide the customer with instant access to the Internet, and in the case of an MTA, also to ensure that the customer's telephone service is always available. Anytime the cable modem is powered-on, whether idle or transmitting data, it must maintain registration with the CMTS and participate in the calculation of the upstream channel quality metric, such as a digital modulation quality metric like the modulation error ratio (MER), or a power-based signal quality metric like the signal-to-noise ratio (SNR or S/N). When the cable modem is not transmitting data, it relies solely on ranging messages to maintain registration and for the calculation of the upstream channel quality measurements.

In an exemplary prior art system, a CMTS configured to use DOCSIS 3.0 upstream channel bonding may communicate with a DOCSIS 3.0 bonded cable modem configured with the DOCSIS T4 Timeout Multiplier. If the cable modem uses, for example, four upstream channels in a bonding group and a ranging interval for each upstream channel of 10 seconds, for example, the T4 Timeout Multiplier is set to 4 (i.e., the number of bonded channels) and the ranging interval increases to 40 seconds (4×10 seconds). However, the CMTS also periodically monitors the quality of the upstream channels by retrieving the upstream channel SNR measurements, for example, every 10 seconds, especially when the cable modem includes a VoIP adapter. Since the T4 Timeout Multiplier increases the ranging interval, when the cable modem is not transmitting data, and since the calculation of the SNR measurements relies solely on the ranging messages, the use of the T4 Timeout Multiplier can affect the accuracy of the SNR measurements. Regardless of the approach taken, the prior art CMTS that implements the T4 Timeout Multiplier suggested by DOCSIS to reduce the ranging traffic can create a problem with the channel quality measurements. The following two examples illustrate the possible impact on the accuracy of the SNR measurements.

In the first example, when the prior art CMTS monitors the upstream channel quality by retrieving the SNR measurements for the channel from a single modem, the cable modem will complete its first ranging exchange, and will wait 40 seconds (4×10 seconds) before the next ranging exchange. After the cable modem completes its first ranging exchange, the CMTS can measure the quality of the channel by retrieving the SNR statistics for the channel from its Broadcom registers, and clearing those registers to prepare for the next SNR measurement. These SNR statistics are valid. Since the CMTS monitors the quality of the upstream channels periodically, but before the next ranging interval, the next time the CMTS measures the quality of the channel, if the cable modem is idle during that period ("idle" meaning no ranging or data passing), the SNR statistics will be zero because the previous reading of the SNR statistics cleared the Broadcom registers that store the SNR data. This will continue until the CMTS measures the quality of the channel after the next ranging exchange. When the SNR statistics are zero, the CMTS is not able to determine the quality of the channel. Thus, in this example, the T4 Timeout Multiplier suggested by DOCSIS to reduce the ranging traffic causes a problem with the channel quality measurements.

In the second example, when the prior art CMTS monitors the upstream channel quality by averaging the SNR measurement for the channel from all the cable modems using the channel, the cable modems will complete their first ranging exchange, and will wait, for example, 40 seconds (4×10 seconds) before the next ranging exchange. After the cable modems complete their first ranging exchange, the CMTS measures the quality of the channel by retrieving the SNR statistics for the channel from its Broadcom registers, and clearing those registers to prepare for the next SNR measurement. These SNR statistics are valid. Since ranging exchanges occur, for example, every 40 seconds, and channel quality is monitored, for example, every 10 seconds, the first time the SNR statistics are retrieved following a ranging exchange the SNR statistics are valid, but SNR statistics for the channel on all of the modems cannot be trusted because not all the cable modems range at the same time. Laboratory experiments that included between 50 and 100 cable modems on an upstream channel that was unimpaired resulted in average channel SNR measurements of 42, 40, 23, 18, 38, and 42. The inconsistency of these SNR measurement will result in the prior art CMTS spectrum management services swapping frequencies or modulation profiles unnecessarily because it will think that the channel has gone from unimpaired to impaired and back to unimpaired.

Since the CMTS can reduce the frequency of the exchange of ranging messages, there is a need to maintain the stability of the upstream channel quality measurements in an upstream channel bonded system when the DOCSIS T4 Timeout Multiplier is in use.

DETAILED DESCRIPTION

A method and computing device are provided for maintaining the stability of the upstream channel quality measurements in an upstream channel bonded system. The method configures a cable modem, that communicates using bonded channels, to periodically exchange ranging messages on the bonded channels, where a bonded channel ranging interval determines a period for the exchange. The method also monitors a signal quality metric for a monitored channel of the bonded channels by periodically retrieving a quality measurement for the monitored channel, a period between each retrieval determined by a channel quality monitoring interval. The method sends an invite ranging message to the cable modem before retrieval of the quality measurement for the monitored channel, and retrieves the quality measurement for the monitored channel. The method bases the signal quality metric for the monitored channel on the quality measurement.

Figure 1:
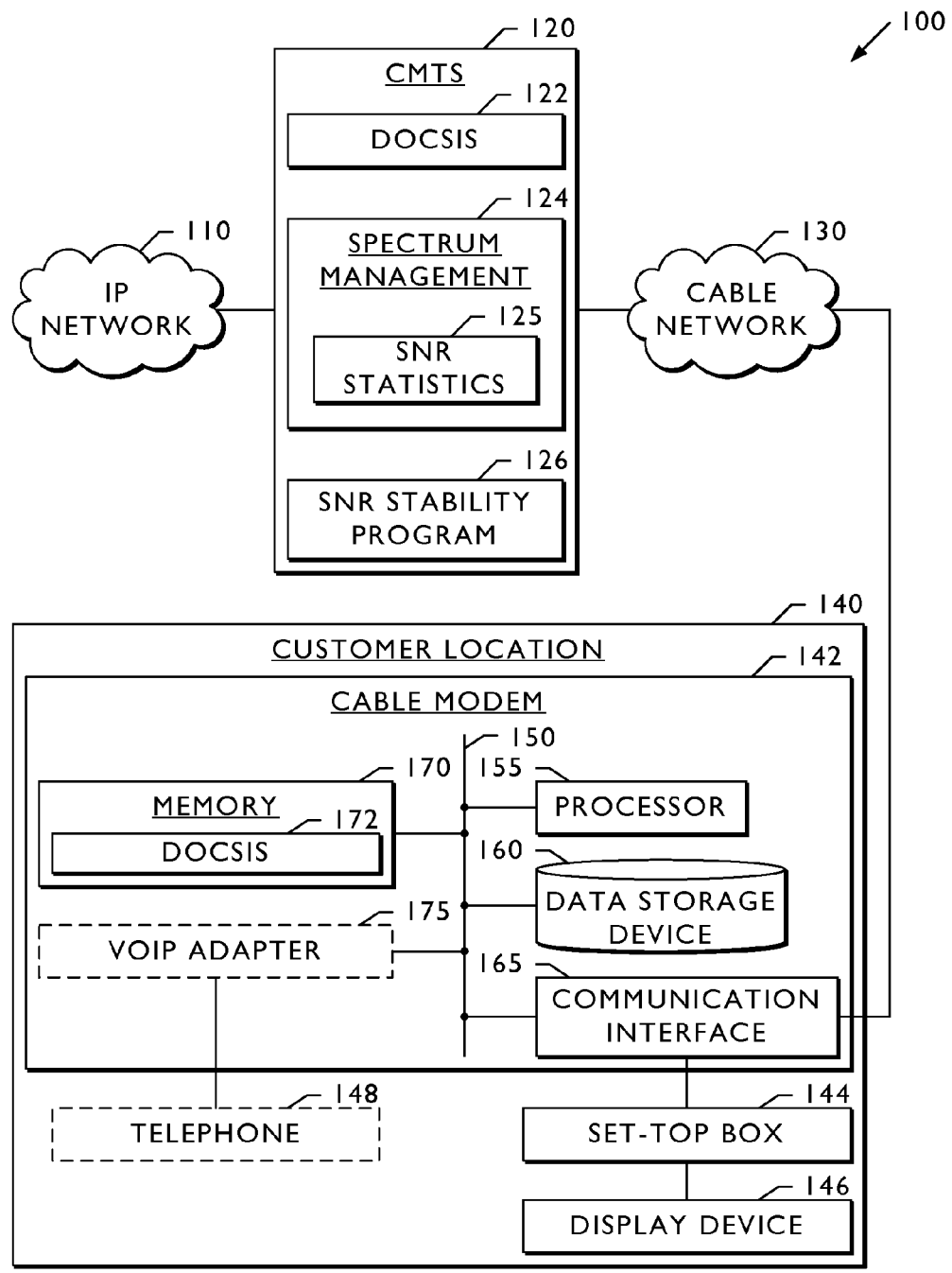
FIG. 1 is a block diagram that illustrates an example of hardware components of a system that performs in accordance with an embodiment.

FIG. 1 is a block diagram that illustrates an example of hardware components of a system that performs in accordance with an embodiment. A broadband network 100 includes an Internet protocol (IP) network 110, cable modem termination system (CMTS) 120, cable network 130, and customer location 140. The broadband network 100 shown in FIG. 1 may include any number of interconnected IP network 110, CMTS 120, cable network 130, and customer location 140 components.

The IP network 110 shown in FIG. 1, in one embodiment, is a public communication network or wide area network (WAN) that connects to the CMTS 120. An embodiment also contemplates the use of comparable network architectures including a LAN, a personal area network (PAN) such as a Bluetooth network, a wireless LAN (e.g., a wireless-fidelity (Wi-Fi) network), peer-to-peer overlay network, and a virtual private network (VPN). The system contemplates comparable network architectures and protocols such as Ethernet and transmission control protocol.

The cable network 130 shown in FIG. 1, in one embodiment, is a hybrid fiber-coaxial (HFC) network. The cable network 130 is a data and video content network that provides two-way communication between the CMTS 120 and customer location 140.

The CMTS 120, in one embodiment, is communication equipment located in a cable operator's headend or hubsite that provides high-speed data services, such as cable Internet or voice over Internet protocol (VoIP), to cable subscribers. The CMTS 120 shown in FIG. 1 is a computing device that provides the customer location 140 with Data Over Cable Service Interface Specification (DOCSIS) 122 and spectrum management 124 services, signal-to-noise ratio (SNR) stability program 126, and connections to the IP network 110 and cable network 130. The DOCSIS 122 service is an implementation of DOCSIS 3.0, or similar service, that provides upstream channel bonding to support allocating traffic across two or more upstream channels. The spectrum management 124 service is an implementation of the DOCSIS 3.0 spectrum management, or a similar service, that monitors channels in an upstream bonding group to determine whether those channels are clean enough to transmit data packets successfully, or impaired and not likely to transmit data packets successfully. In one embodiment, the spectrum management 124 service retrieves SNR statistics 125 from the CMTS 120 Broadcom registers for the channel that it is monitoring. The DOCSIS 122 and spectrum management 124 services, and SNR stability program 126 together with the cable modem 142 perform a method disclosed in the exemplary embodiments depicted in FIG. 2, FIG. 3, and FIG. 4. The connection to the IP network 110 enable the CMTS 120 to provide access to external services such as video servers, public switched telephone network voice, multimedia messages, and Internet data. In another embodiment, the CMTS 120 monitors the upstream channel quality measurement by providing a modulation error ratio (MER) stability program, rather than the SNR stability program 126, and the spectrum management 124 service retrieves MER statistics, rather than SNR statistics 125. Even though this description describes the use of SNR statistics 125 to stabilize the upstream channel SNR measurement, one skilled in the art will appreciate that embodiments can similarly utilize MER statistics to stabilize the upstream channel MER measurements.

The customer location 140 shown in FIG. 1 is a customer's home, business, or another location where the customer accesses the cable service. In one embodiment, the customer location 140 includes a cable modem 142, set-top box 144, and display device 146. In other embodiments, the set-top box 144 is a digital television (DTV) Converter (DTC) or other customer-premises equipment (CPE), and the display device 146 is an Internet protocol television (IPTV) or analog television. In yet another embodiment, the set-top box 144 includes the cable modem 142. Optionally, the cable modem 142 is a multimedia terminal adapter (MTA) that provides all of the functionality of a cable modem, as well as a VoIP adapter that connects the cable modem 142 to a telephone 148 at the customer location 140.

The cable modem 142 shown in FIG. 1, in an illustrative example, is a general-purpose computing device that performs, in accordance with an embodiment, together with the DOCSIS 122 and spectrum management 124 services, and SNR stability program 126 on the CMTS 120. A bus 150 is a communication medium connecting a processor 155, data storage device 160 (such as a serial ATA (SATA) hard disk drive, optical drive, small computer system interface (SCSI) disk, flash memory, or the like), communication interface 165, and memory 170 (such as random access memory (RAM), dynamic RAM (DRAM), non-volatile computer memory, flash memory, or the like). The communication interface 165 connects the cable modem 142 to the cable network 130 and allows for two-way communication of data and content. Optionally, the bus 150 connects a VoIP adapter 175 to a telephone 148 and provides telephone service communication. In one embodiment, the set-top box 144 includes the cable modem 142 implemented as an application-specific integrated circuit (ASIC).

The processor 155 performs the disclosed methods by executing sequences of operational instructions that comprise each computer program resident in, or operative on, the memory 170. The reader should understand that the memory 170 may include operating system, administrative, and database programs that support the programs disclosed in this application. In one embodiment, the configuration of the memory 170 of the cable modem 142 includes a DOCSIS 172 service. In one embodiment, the DOCSIS 172 service is an implementation of DOCSIS 3.0, or similar service, that provides upstream channel bonding to support allocating traffic across two or more upstream channels. The DOCSIS 172 service on the cable modem 142 together with the DOCSIS 122 and spectrum management 124 services, and SNR stability program 126 on the CMTS 120 perform a method according to an embodiment, e.g., as disclosed in the exemplary embodiments depicted in FIG. 2, FIG. 3, and FIG. 4. When the processor 155 performs the disclosed method, it stores intermediate results in the memory 170 or data storage device 160. In another embodiment, the processor 155 may swap these programs, or portions thereof, in and out of the memory 170 as needed, and thus may include fewer than all of these programs at any one time.

Figure 2:
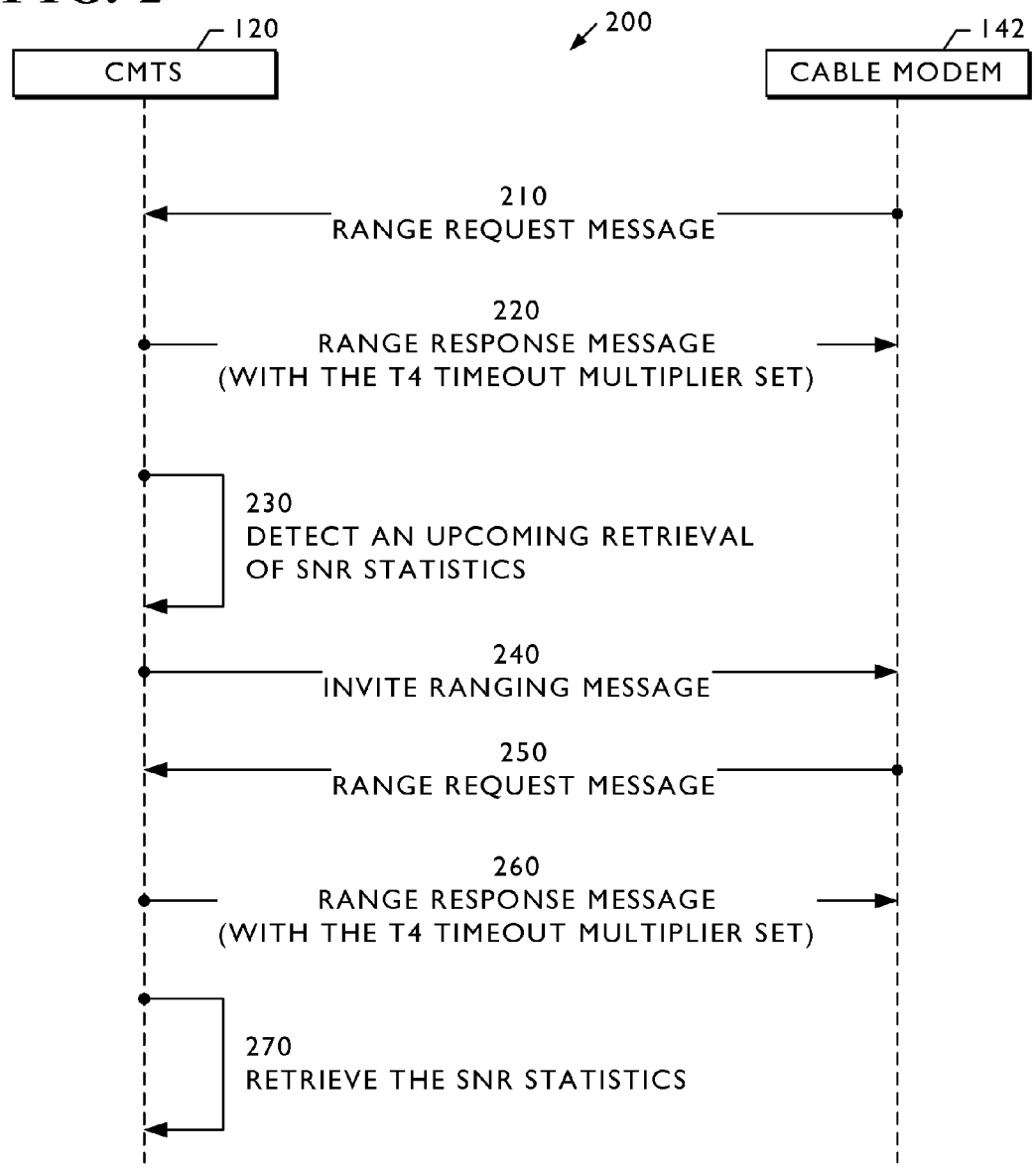
FIG. 2 is a message flow diagram that illustrates a method for stabilizing the upstream channel quality measurements in an upstream channel bonded system when the DOCSIS T4 Timeout Multiplier is in use according to an embodiment.

FIG. 2 is a message flow diagram that illustrates a method for stabilizing the upstream channel quality measurements in an upstream channel bonded system when the DOCSIS T4 Timeout Multiplier is in use according to one embodiment. The embodiment shown in FIG. 2, with reference to FIG. 1, illustrates an exemplary message flow between the CMTS 120 and the cable modem 142. The CMTS 120 uses DOCSIS 3.0 upstream channel bonding to communicate with the cable modem 142, a DOCSIS 3.0 bonded modem configured with the DOCSIS T4 Timeout Multiplier. Similar to the exemplary prior art system described above, the cable modem 142 uses, for example, four upstream channels in a bonding group with a ranging interval for each upstream channel of 10 seconds, for example, and sets the T4 Timeout Multiplier, for example, to 4 (i.e., the number of bonded channels). Thus, the use of the T4 Timeout Multiplier increases the ranging interval, for example, to 40 seconds (4×10 seconds) for the upstream channels in the bonding group.

As shown in FIG. 2, the cable modem 142 begins the message flow by sending a range request message to the CMTS 120 (step 210). In various embodiments, the range request message is the DOCSIS 3.0 RNG-REQ, INIT-RNG-REQ, and B-INIT-RNG-REQ. After the CMTS 120 receives the range request message, it sends a range response message with the T4 Timeout Multiplier set to a value that will increase the T4 timeout (step 220). In one embodiment, the range response message is the DOCSIS 3.0 RNG-RSP. After sending the range response message, the CMTS 120 detects that the spectrum management 124 service is about to monitor the upstream channel quality by retrieving the SNR statistics 125 (step 230). In one embodiment, the CMTS 120 sets a ranging timer to fire between 1 and 2 seconds before retrieving the SNR statistics 125. When the CMTS 120 detects this situation, it sends an invite ranging message to the cable modem 142 that is used to monitor the channel (step 240). In one embodiment, the invite ranging message is a request to schedule an opportunity for the cable modem 142 to range. Thus, when the CMTS 120 invites the modem to range, it gives the cable modem 142 an immediate opportunity to send a RNG-REQ (station maintenance request message). This RNG-REQ is what puts the valid data in the Broadcom chip that the system needs to collect for the SNR measurement. In response, the cable modem 142 immediately sends a range request message to the CMTS 120 (step 250), that triggers the CMTS 120 to send a range response message with the T4 Timeout Multiplier set to a value that will increase the T4 timeout (step 260). In one embodiment, the range request message is the DOCSIS 3.0 RNG-REQ, and the range response message is the DOCSIS 3.0 RNG-RSP. The spectrum management 124 service of the CMTS 120 then retrieves the SNR statistics 125 (step 270). In another embodiment, the detection by the CMTS 120 of the upcoming retrieval of SNR statistics 125 (step 230) includes a determination that the channel has been idle since the previous retrieval of the SNR statistics 125.

Figure 3:
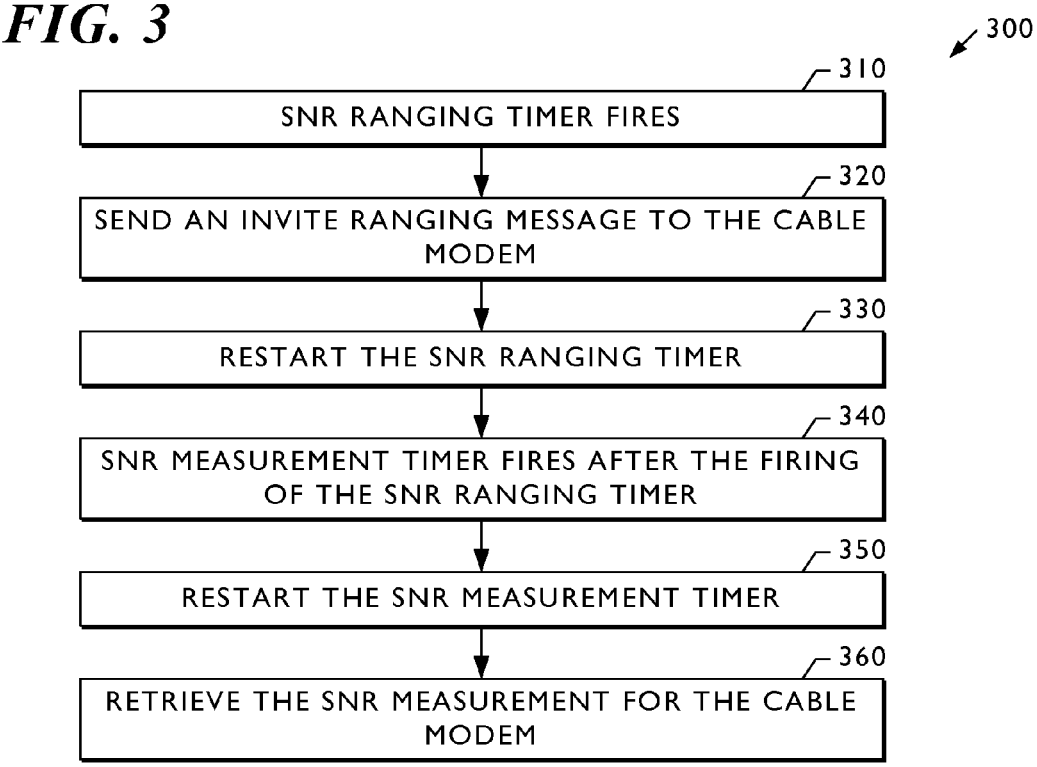
FIG. 3 is a flow diagram that illustrates a method for stabilizing the upstream channel quality measurements when monitoring the upstream channel quality by retrieving the upstream channel quality measurements for a channel from a single modem according to an embodiment.

FIG. 3 is a flow diagram that illustrates a method for stabilizing the upstream channel quality measurements when monitoring the upstream channel quality by retrieving the upstream channel quality measurements for a channel from a single modem according to one embodiment. The process 300 presumes that the cable modem 142 has been configured to communicate using bonded channels, and has begun exchanging ranging messages on the bonded channels at a bonded channel ranging interval. In one exemplary embodiment, the CMTS 120 uses DOCSIS 3.0 upstream channel bonding to communicate with the cable modem 142, a DOCSIS 3.0 bonded modem configured with the DOCSIS T4 Timeout Multiplier. Similar to the exemplary prior art system described above, the cable modem 142 uses, for example, four upstream channels in a bonding group with a ranging interval for each upstream channel of 10 seconds, for example, and sets the T4 Timeout Multiplier, for example, to 4 (i.e., the number of bonded channels). Thus, the use of the T4 Timeout Multiplier increases the ranging interval to 40 seconds (4×10 seconds). In addition, the CMTS 120 spectrum management 124 service periodically monitors the upstream channel quality by retrieving the SNR statistics 125 for one of the bonded channels at a channel quality monitoring interval, for example, of 10 seconds. When the channel quality monitoring interval is less than the bonded channel ranging interval, and the cable modem 142 is idle ("idle" meaning no ranging or data passing), the CMTS 120 can ensure that the SNR statistics 125 are accurate, and take appropriate action when the channel is impacted, by detecting an upcoming retrieval of the SNR statistics 125 and forcing a ranging message. FIG. 3 illustrates one mechanism for detecting an upcoming retrieval of the SNR statistics 125 by detecting when an SNR ranging timer fires on the CMTS 120 (step 310). The firing of the SNR ranging timer triggers the CMTS 120 to send an invite ranging message to the cable modem 142 (step 320). The CMTS 120 restarts the SNR ranging timer (step 330), and waits for the SNR measurement timer to fire (step 340). In one embodiment, the SNR measurement timer fires between 1 and 2 seconds, for example, after the SNR ranging timer. The process 300 restarts the SNR measurement timer (step 350) and retrieves the SNR measurement for the cable modem 142 (step 360). By sending the invite ranging message before the CMTS 120 retrieves the SNR statistics 125, the process 300 will ensure valid SNR statistics are available to monitor the channel quality. The process 300 will increase the ranging traffic for only the cable modem 142 used to monitor the channel, and leave all of the remaining cable modems to operate with a ranging interval, for example, of 40 seconds. An advantage of the process 300 is that it allows the DOCSIS T4 Timeout Multiplier to operate for all of the remaining modems the way it was designed to operate.

Figure 4:
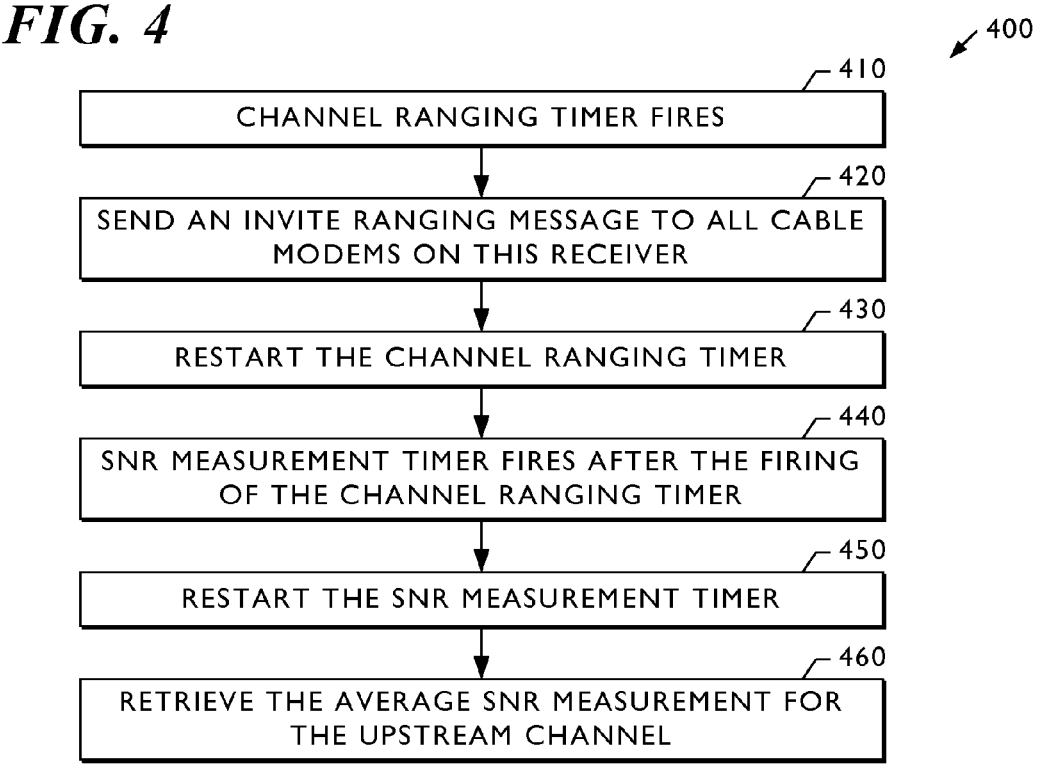
FIG. 4 is a flow diagram that illustrates a method for stabilizing the upstream channel quality measurements when monitoring the upstream channel quality by averaging the upstream channel quality measurements for a channel from all the cable modems using the channel according to an embodiment.

FIG. 4 is a flow diagram that illustrates a method for stabilizing the upstream channel quality measurements when monitoring the upstream channel quality by averaging the upstream channel quality measurements for a channel from all the cable modems using the channel according to one embodiment. Using the same exemplary embodiment as described for FIG. 3, the process 400 shown in FIG. 4 detects an upcoming retrieval of SNR statistics 125 when the channel ranging timer fires on the CMTS 120 (step 410). The channel ranging timer triggers the CMTS 120 to send an invite ranging message to all of the cable modems 142 on this receiver (step 420). The CMTS 120 restarts the channel ranging timer (step 430), and waits for the SNR measurement timer to fire (step 440). In one embodiment, the SNR measurement timer fires between 1 and 2 seconds, for example, after the channel ranging timer. The process 400 restarts the SNR measurement timer (step 450) and retrieves the SNR measurement for the upstream channel (step 460). By sending the invite ranging messages before the CMTS 120 retrieves the SNR statistics 125, the process 400 will stabilize the SNR measurement of the channel, but it defeats the intended purpose of the T4 Timeout Multiplier (i.e., to reduce CMTS overhead associated with scheduling the messages). In another embodiment, the CMTS 120 reduces the overhead associated with scheduling the messages by only sending the ranging messages to the modems that are not passing data. In another embodiment, the CMTS 120 reduces the overhead associated with scheduling the messages by only sending the ranging messages to every other modem in a list alternating each time an SNR measurement is performed.

Although the disclosed embodiments describe a fully functioning method and computing device for maintaining the stability of the upstream channel quality measurements in an upstream channel bonded system when the DOCSIS T4 Timeout Multiplier is in use, the reader should understand that other equivalent embodiments exist. Since numerous modifications and variations will occur to those reviewing this disclosure, the method and computing device for maintaining the stability of the upstream channel quality measurements in an upstream channel bonded system when the DOCSIS T4 Timeout Multiplier is in use is not limited to the exact construction and operation illustrated and disclosed. Accordingly, this disclosure intends all suitable modifications and equivalents to fall within the scope of the claims.

We claim:

1. A method, comprising:
configuring a cable modem, that communicates using bonded channels, to periodically exchange ranging messages on the bonded channels, wherein a bonded channel ranging interval determines a period for the exchange;
monitoring a signal quality metric for a monitored channel of the bonded channels by periodically retrieving a quality measurement for the monitored channel, a period between each retrieval determined by a channel quality monitoring interval;
sending an invite ranging message to the cable modem before retrieval of the quality measurement for the monitored channel; and
retrieving the quality measurement for the monitored channel, wherein the signal quality metric for the monitored channel is based on the quality measurement;
wherein the configuring of the cable modem further comprises:
receiving a range request message; and
sending a range response message that includes a timeout multiplier for the bonded channels,
wherein the bonded channel ranging interval is a product of a channel ranging interval for the cable modem and the timeout multiplier; wherein the signal quality metric for the monitored channel is an average of the quality measurement retrieved from the cable modem and at least one other cable modem that each communicate using the monitored channel.

2. The method of claim 1, wherein the bonded channels are upstream bonded channels.

3. The method of claim 1, wherein the timeout multiplier is a DOCSIS T4 Timeout Multiplier.

4. The method of claim 1, wherein the signal quality metric includes at least one of signal-to-noise ratio (SNR), and modulation error ratio (MER).

5. The method of claim 1, wherein the sending of the invite ranging message further comprises:
detecting an upcoming retrieval of the quality measurement for the monitored channel; and
detecting idle communication on the monitored channel since the previous retrieval of the quality measurement for the monitored channel.

6. The method of claim 5, wherein the detecting of the upcoming retrieval further comprises:
detecting an expiration of a ranging timer; and
restarting the ranging timer,
wherein the expiration of the ranging timer triggers the sending of the invite ranging message.

7. The method of claim 1, wherein the retrieving of the quality measurement further comprises:
detecting an expiration of a quality measurement timer.

8. The method of claim 1, wherein the bonded channel ranging interval is greater than the channel quality monitoring interval.

9. A computing device, comprising:
a memory device resident in the computing device; and
a processor disposed in communication with the memory device, the processor configured to:
configure a cable modem, that communicates using bonded channels, to periodically exchange ranging messages on the bonded channels, wherein a bonded channel ranging interval determines a period for the exchange;
monitor a signal quality metric for a monitored channel of the bonded channels by periodically retrieving a quality measurement for the monitored channel, a period between each retrieval determined by a channel quality monitoring interval;
send an invite ranging message to the cable modem before retrieval of the quality measurement for the monitored channel; and
retrieve the quality measurement for the monitored channel, wherein the signal quality metric for the monitored channel is based on the quality measurement;
wherein to configure the cable modem, the processor is further configured to:
receive a range request message; and
send a range response message that includes a timeout multiplier for the bonded channels,
wherein the bonded channel ranging interval is a product of a channel ranging interval for the cable modem and the timeout multiplier; wherein the signal quality metric for the monitored channel is an average of the quality measurement retrieved from the cable modem and at least one other cable modem that each communicate using the monitored channel.

10. The computing device of claim 9, wherein the bonded channels are upstream bonded channels.

11. The computing device of claim 9, wherein the timeout multiplier is a DOCSIS T4 Timeout Multiplier.

12. The computing device of claim 9, wherein the signal quality metric includes at least one of signal-to-noise ratio (SNR), and modulation error ratio (MER).

13. The computing device of claim 9, wherein to send the invite ranging message, the processor is further configured to:
    detect an upcoming retrieval of the quality measurement for the monitored channel; and
    detect idle communication on the monitored channel since the previous retrieval of the quality measurement for the monitored channel.

14. The computing device of claim 13, wherein to detect the upcoming retrieval, the processor is further configured to:
    detect an expiration of a ranging timer; and
    restart the ranging timer,
    wherein the expiration of the ranging timer triggers the sending of the invite ranging message.

15. The computing device of claim 9, wherein to retrieve the quality measurement, the processor is further configured to:
    detect an expiration of a quality measurement timer.

16. The computing device of claim 9, wherein the bonded channel ranging interval is greater than the channel quality monitoring interval.

17. A non-transitory computer-readable medium, comprising computer-executable instructions that, when executed on a computing device, perform steps of:
    configuring a cable modem, that communicates using bonded channels, to periodically exchange ranging messages on the bonded channels, wherein a bonded channel ranging interval determines a period for the exchange;
    monitoring a signal quality metric for a monitored channel of the bonded channels by periodically retrieving a quality measurement for the monitored channel, a period between each retrieval determined by a channel quality monitoring interval;
    sending an invite ranging message to the cable modem before retrieval of the quality measurement for the monitored channel; and
    retrieving the quality measurement for the monitored channel, wherein the signal quality metric for the monitored channel is based on the quality measurement;
    wherein the configuring of the cable modem further comprises:
      receiving a range request message; and
      sending a range response message that includes a timeout multiplier for the bonded channels,
      wherein the bonded channel ranging interval is a product of a channel ranging interval for the cable modem and the timeout multiplier; wherein the signal quality metric for the monitored channel is an average of the quality measurement retrieved from the cable modem and at least one other cable modem that each communicate using the monitored channel.

\* \* \* \* \*